United States Patent
Engelhardt et al.

(10) Patent No.: US 9,817,965 B2
(45) Date of Patent: *Nov. 14, 2017

(54) SYSTEM AND METHOD FOR AUTHENTICATION WITH A COMPUTER STYLUS

(71) Applicant: Microsoft Technology Licensing, LLC, Redmond, WA (US)

(72) Inventors: Leonard Engelhardt, Moshav Ora (IL); Guy Paradis, Kiryat-Tivon (IL); Tomer Kahan, Ramat-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,399

(22) Filed: Dec. 29, 2016

(65) Prior Publication Data

US 2017/0109516 A1    Apr. 20, 2017

Related U.S. Application Data

(63) Continuation of application No. 13/425,610, filed on Mar. 21, 2012.
(Continued)

(51) Int. Cl.
*G06F 21/36* (2013.01)
*G06F 3/038* (2013.01)
(Continued)

(52) U.S. Cl.
CPC ............ *G06F 21/36* (2013.01); *G06F 3/0383* (2013.01); *G06F 3/03545* (2013.01); *G06F 3/04883* (2013.01); *G06F 21/32* (2013.01)

(58) Field of Classification Search
None
See application file for complete search history.

(56) References Cited

U.S. PATENT DOCUMENTS

| | | |
|---|---|---|
| 6,690,156 B1 | 2/2004 | Weiner et al. |
| 7,048,178 B2 | 5/2006 | Silverbrook et al. |

(Continued)

FOREIGN PATENT DOCUMENTS

| | | |
|---|---|---|
| EP | 2264641 | 12/2010 |
| WO | WO 2012/127471 | 9/2012 |

OTHER PUBLICATIONS

Advisory Action Before the Filing of an Appeal Brief dated Nov. 14, 2014 From the US Patent and Trademark Office Re. U.S. Appl. No. 13/425,610.
(Continued)

*Primary Examiner* — David D Davis

(57) ABSTRACT

A method for securing operation of a computing device operated with a stylus includes recognizing a pre-defined gesture performed by a stylus on a touch screen, the pre-defined gesture defined as a user command to lock an item displayed on the touch screen, determining a location of the gesture, determining identity of the stylus, locking an item displayed at the location determined, and recording identity of the stylus. A method for operating a computing device with a stylus includes receiving a command with a stylus to add restricted annotations to a document, receiving identity of the stylus, linking an annotation to the identity, restricting display of the annotation on the document to a computing device receiving input from the stylus; and displaying the document absent the at least one annotation on a computing device on which input from the stylus is not received.

20 Claims, 10 Drawing Sheets

Related U.S. Application Data

(60) Provisional application No. 61/454,604, filed on Mar. 21, 2011.

(51) Int. Cl.
    *G06F 21/32* (2013.01)
    *G06F 3/0488* (2013.01)
    *G06F 3/0354* (2013.01)

(56) References Cited

U.S. PATENT DOCUMENTS

| | | | |
|---|---|---|---|
| 7,292,229 | B2 | 11/2007 | Morag et al. |
| 7,372,455 | B2 | 5/2008 | Perski et al. |
| 7,593,000 | B1 | 9/2009 | Chin |
| 7,843,439 | B2 | 11/2010 | Perski et al. |
| 2002/0109677 | A1 | 8/2002 | Taylor |
| 2004/0172535 | A1 | 9/2004 | Jakobsson et al. |
| 2007/0139399 | A1 | 6/2007 | Cook |
| 2008/0128180 | A1 | 6/2008 | Perski et al. |
| 2008/0141361 | A1 | 6/2008 | Balfanz |
| 2008/0168396 | A1* | 7/2008 | Matas ............... G01C 21/3664 715/840 |
| 2009/0044260 | A1 | 2/2009 | Niglio et al. |
| 2010/0079414 | A1 | 4/2010 | Ferlitsch |
| 2010/0155153 | A1 | 6/2010 | Zachut |
| 2012/0242603 | A1 | 9/2012 | Engelhardt et al. |

OTHER PUBLICATIONS

Communication Relating to the Results of the Partial International Search Dated Jul. 23, 2012 From the International Searching Authority Re. U.S. Application No. PCT/IL2012/050099.

International Preliminary Report on Patentability Dated Oct. 3, 2013 From the International Bureau of WIPO Re. Application No. PCT/IL2012/050099.

International Search Report and the Written Opinion dated Apr. 2, 2013 From the International Searching Authority Re. Application No. PCT/IL2012/050099.

Official Action dated Feb. 26, 2014 From the US Patent and Trademark Office Re. U.S. Appl. No. 13/425,610.

Official Action dated Jan. 29, 2015 From the US Patent and Trademark Office Re. U.S. Appl. No. 13/425,610.

Official Action dated Jul. 31, 2014 From the US Patent and Trademark Office Re. U.S. Appl. No. 13/425,610.

IBM "Automatic Stylus Identification System", IBM Technical Disclosure Bulletin, XP000211156, 34(2): 406-409, Jul. 1991.

Communication Pursuant to Article 94(3) EPC dated Jun. 16, 2017 From the European Patent Office Re. Application No. 12720969.0. (10 Pages).

Official Action dated Jun. 27, 2017 From the US Patent and Trademark Office Re. U.S. Appl. No. 13/425,610. (6 pages).

* cited by examiner

SYSTEM AND METHOD FOR AUTHENTICATION WITH A COMPUTER STYLUS

RELATED APPLICATIONS

This application is a continuation of U.S. patent application Ser. No. 13/425,610 filed on Mar. 21, 2012, which claims the benefit of priority of U.S. Provisional Patent Application No. 61/454,604 filed on Mar. 21, 2011. The contents of the above applications are all incorporated by reference as if fully set forth herein in their entirety.

FIELD OF THE INVENTION

The present invention, in some embodiments thereof, relates to computing devices that are operated with a stylus and, more particularly, but not exclusively, to secure operation of a computing device operated with a stylus.

BACKGROUND OF THE INVENTION

Touch technologies are commonly used as input devices for a variety of electronic products. The usage of touch devices of various kinds is growing sharply due to the emergence of new mobile devices such as Personal Digital Assistants (PDA), tablet PCs, wireless flat panel displays (FPD), smart phones and other devices. Some of these devices are not connected to standard keyboards, mice or like input devices, which are deemed to limit their mobility. Instead there is a tendency to use touch input technologies of one kind or another.

One type of touch technology is a touch screen and/or transparent digitizer system overlaid on a display that can be operated by one or more fingers and/or styluses touching the screen. The finger or stylus can be used for selecting objects displayed on a screen, opening a document or scrolling within a window, entering data such as hand-written text and drawings, performing graphical operations such as moving or otherwise manipulating objects, or the like. Optionally a user is required to enter a security code with the finger or stylus to gain access to a computing device, a specific application and/or secure information stored in the device. The procedure of entering a security code is time consuming and at times cumbersome. Sometimes the security level of such systems is compromised when a user gains legitimate secured access and then leaves an authenticated session open.

U.S. Patent Application Publication No. 2010/0155153 entitled "Digitizer, Stylus and Method of Synchronization Therewith" which is hereby incorporated by reference in its entirety, describes a method for operating a digitizer with an autonomous asynchronous stylus. Typically the stylus is self-powered, e.g. battery operated that transmits signal bursts at a defined rate. It is described that the signal burst transmitted by the stylus can be modulated to encode identification data for identifying the stylus.

U.S. Patent Application Publication No. 2010/0079414 entitled "Apparatus, system, and methods for authentication on a publicly accessed shared interactive device" which is hereby incorporated by reference in its entirety, describes a digital surface that provides a display work area for each of a plurality of personal digital device (PDD) in communication with the digital surface. Each PDD establishes secured communication with the digital surface identified by a security token. Each PDD includes a stylus adapted to receive the security token for use in exchanges with the digital surface to thereby associate the exchange with the authenticated PDD with which it is coupled. Actions taken by a user of a stylus on the digital surface are authenticated based on the security token and based on the location of the stylus when the action is requested.

U.S. Patent Application Publication No. 2008/0141361 entitled "Systems and methods for lightweight authentication" which is hereby incorporated by reference in its entirety, describes techniques for the lightweight authentication of a user to an application, a computer or other device. An interaction element such as a stylus, a pen or a marker is uniquely identified with an authentication sensor embedded within a tablet personal computer. The interactive element is associated with a user and includes an identification element that is either passive or active. The proximity of the identification element to the authentication sensor during data entry operations to the authentication sensor, signals the controlled application that the user has been authenticated.

U.S. Pat. No. 7,843,439, entitled "Touch Detection for a Digitizer" assigned to N-trig Ltd., the contents of which is incorporated herein by reference, describes a detector for detecting both an electromagnetic stylus emitting a signal and interaction with finger touch. The detector typically includes a digitizer sensor with a grid of sensing conductive lines for sensing location of an electromagnetic stylus and a finger. The detector is capable of detecting simultaneous occurrences of multiple styluses and/or multiple finger touches.

SUMMARY OF THE INVENTION

According to an aspect of some embodiments of the present invention, there is provided a system and method for securing operation of a computing device with a stylus. According to some embodiments of the present invention, a stylus is used to selectively lock access to documents, files, emails, games, entries in a table, applications and/or operating systems of computing devices responsive to a gesture performed by a stylus. According to some embodiments of the present invention, a stylus is used to limit environments on which inking and/or annotations are displayed. According to some embodiments of the present invention, a stylus is used to associate an author with modifications added to a document.

According to an aspect of some embodiments of the present invention, there is provided for a method for securing operation of a computing device operated with a stylus, the method including recognizing a pre-defined gesture performed by a stylus on a touch screen, the pre-defined gesture defined as a user command to lock an item displayed on the touch screen, determining a location at which the gesture was performed, determining identity of the stylus performing the gesture, locking an item displayed at the location determined, and recording identity of the stylus initiating the command to lock.

Optionally, the item displayed includes at least one of a document, a file, an email, an image, an entry in a table and an application.

Optionally, the method includes registering identity of at least one stylus authorized to perform secure operations with the computing device, comparing identity of the stylus performing the gesture with identity of the at least one stylus authorized to perform secure operations with the computing device, and locking the item displayed on the touch screen, responsive to a match between the identity of the stylus performing the gesture and identity of the at least one stylus authorized to perform secure operations with the computing device.

Optionally, the method includes storing information identifying a user authorized to perform secure operations with the stylus.

Optionally, the method includes receiving a command initiated by a stylus to open the item that is locked, determining identity of the stylus initiating the command to open the item that is locked, comparing identity of the stylus initiating the command to open the item displayed on the touch screen and a file that is locked with the recorded identity of the stylus that initiated the command to lock the item displayed on the touch screen, and unlocking the item displayed on the touch screen responsive to a match between identity of the stylus initiating the command to open the item displayed on the touch screen that is locked with the recorded identity of the stylus that initiated the command to lock the item displayed on the touch screen.

Optionally, the method includes storing information for verifying identity of a user in possession of a stylus, requesting verification of identity of a user in possession of the stylus initiating the command to open the item displayed on the touch screen that is locked, and unlocking the item displayed on the touch screen responsive to verification of identity of the user.

Optionally, the information includes at least one of biometric information, a password, a signature and a gesture performed with the stylus.

Optionally, the stylus is operative to transmit an identity code at a pre-defined repetition rate.

Optionally, the stylus is operative to transmit an identity code responsive to a writing tip of the stylus touching the touch screen.

Optionally, the stylus is operative to transmit an identity code response to a user command.

Optionally, the identity code is encoded on a location signal transmitted by the stylus.

Optionally, the identity code is encoded on a burst signal transmitted between location burst signals transmitted by that stylus.

Optionally, the stylus is operative to transmit a dynamic code.

According to an aspect of some embodiments of the present invention, there is provided a method for operating a computing device operated with a stylus, the method including receiving a command with a stylus to add restricted annotations to a document, receiving identity of the stylus providing the command, linking at least one annotation to the identity of the stylus, responsive to receiving the command, restricting display of the at least one annotation on the document to a computing device receiving input from the stylus, and displaying the document absent the at least one annotation on a computing device on which input from the stylus is not received.

Optionally, the document is concurrently displayed with a plurality of computing devices and wherein the document is only displayed on the computing device receiving input from the stylus.

Optionally, the annotations are entered with the stylus.

Optionally, the annotations are entered with at least one of finger touch, keyboard and mouse.

Optionally, displaying the at least one annotation on the document responsive to verifying identity of a user in possession of the stylus.

Optionally, verifying identity of a user includes requesting information from the user, receiving the information from the user, and matching the information received to stored information that was provided by an authorized user for verifying the user.

Optionally, the information is at least one of biometric information, a password, a signature and a gesture performed with the stylus.

Optionally, the stylus is operative to transmit an identity code at a pre-defined repetition rate.

Optionally, the stylus is operative to transmit an identity code responsive to a writing tip of the stylus touching the touch screen.

Optionally, the stylus is operative to transmit an identity code response to a user command.

Optionally, the identity code is encoded on a location signal transmitted by the stylus.

Optionally, the identity code is encoded on a burst signal transmitted between location burst signals transmitted by that stylus.

Optionally, the stylus is operative to transmit a dynamic identity code.

According to an aspect of some embodiments of the present invention, there is provided a method for operating a computing device operated with a stylus, the method including receiving a command with a stylus to track changes to a document, receiving identity of the stylus providing the command, linking changes to the document to the identity of the stylus responsive to receiving the command with the stylus, and displaying the changes to the document that is linked to the identity of the stylus with a same color.

Optionally, the changes to the document are responsive to input from at least one of a stylus, keyboard, mouse and finger touch.

Optionally, the method includes receiving input from at least one other stylus, receiving identity of the at least one other stylus, linking changes to the document responsive to input from the at least one other stylus to identity of the at least one other stylus, and displaying the changes to the document that is linked to the identity of the at least one other stylus with a different color.

Optionally, the stylus is operative to transmit an identity code at a pre-defined repetition rate.

Optionally, the identity code is encoded on a location signal transmitted by the stylus.

Optionally, the identity code is encoded on a burst signal transmitted between location burst signals transmitted by that stylus.

According to an aspect of some embodiments of the present invention, there is provided a method for securing operation of a computing device operated with a stylus, the method including recognizing a pre-defined gesture performed by a stylus on a touch screen, the pre-defined gesture defined as a user command to lock an item displayed on the touch screen, determining identity of the stylus performing the gesture, locking an item displayed on the touch screen, and recording identity of the stylus initiating the command to lock.

Optionally, the pre-define gesture defines the item displayed on the screen to be locked.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
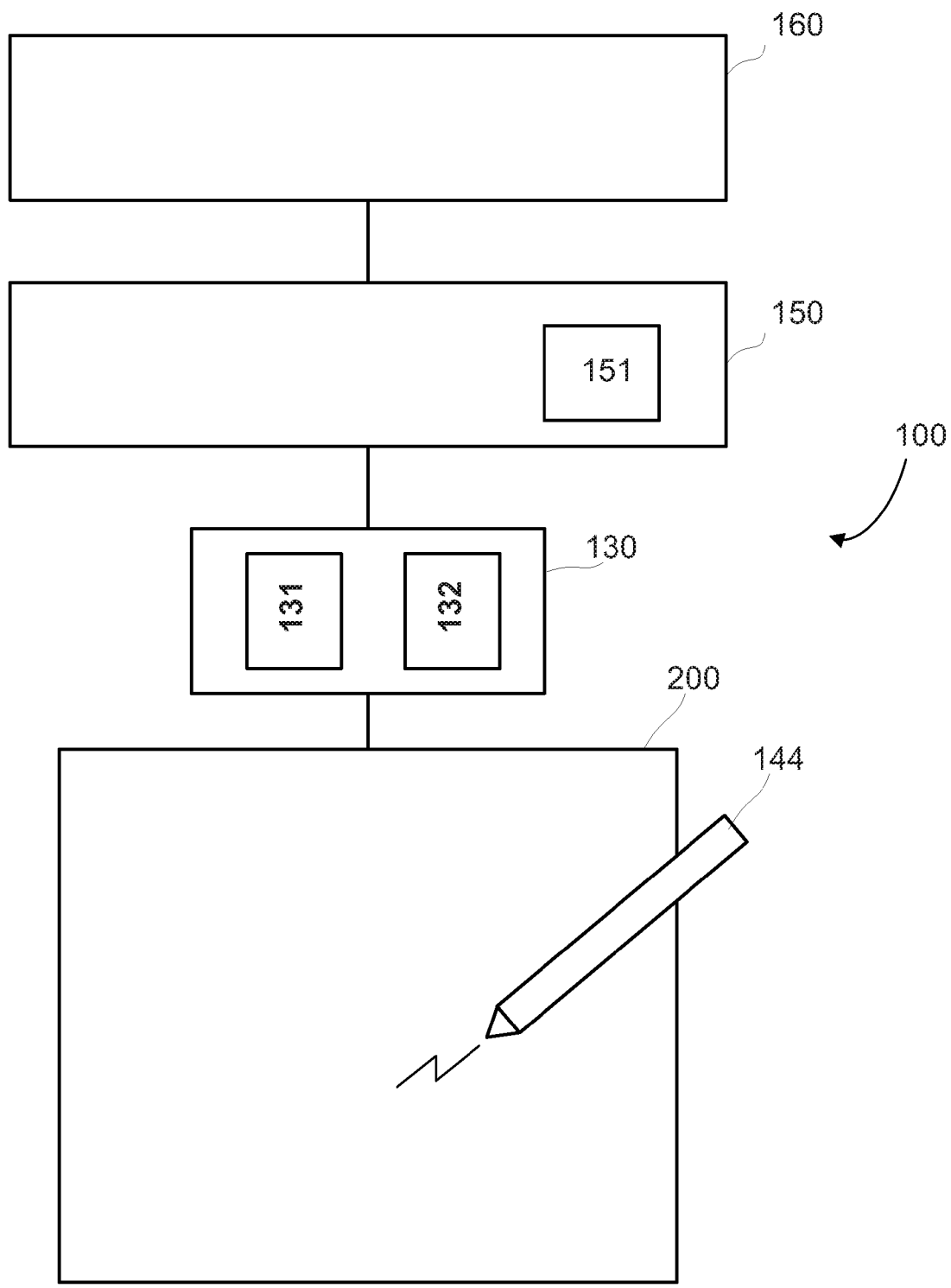
FIG. 1 is a simplified block diagram of an exemplary system providing secured operation with a stylus, in accordance with some embodiments of the present invention.

The present invention, in some embodiments thereof, relates to a computing device operated with a stylus and, more particularly, but not exclusively, to secure operation of a computing device operated with a stylus.

According to some embodiments of the present invention, a stylus, which may also be referred to as a pen, or a digital pen or pencil is used as an electronic key for locking and unlocking access to one or more documents, files, emails, information in a file, entries in a table and/or applications displayed on a touch screen. According to some embodiments of the present invention, the stylus transmits a unique ID signal or code during interaction with a touch screen that is received by the touch screen and used to identify the stylus performing a locking and unlocking command to the computing device. According to some embodiments of the present invention, a locking command is a pre-defined gesture performed by the stylus during interaction with the touch screen. In some exemplary embodiments, the pre-defined gesture for locking can be performed anywhere on an active application that is to be locked. Alternatively, the locking gesture is only recognized for locking when it is performed in a particular location, e.g. a dedicated location on the application. Typically, locking access to an application is accompanied by closing the application, and/or terminating its display on the touch screen.

Typically, the ID code of the stylus performing the pre-defined gesture for locking is stored in a memory unit of the computing device, and is associated with the lock status of the application. In some exemplary embodiments, permission to lock an application with a stylus is only granted to a stylus that has been previously authorized by the computing device. Optionally, authorization is obtained during a registration procedure, e.g. in a one time procedure that is performed when a user first starts using the stylus. Optionally, registration of a stylus for a particular computing device is performed in a manufacturing site.

According to some embodiments of the present invention, a same stylus used to lock access to an application is also required to regain access to the locked application. Optionally, access to the locked application is regained responsive to detecting a signal, e.g. ID signal transmitted by that stylus. In some exemplary embodiments, regaining access is provided by pointing the stylus to a particular location on the touch screen, e.g. a dedicated window displayed on the touch screen and detecting input from the stylus in that location, e.g. ID code of the stylus. In some exemplary embodiments, in addition to identifying the stylus, a code, signature and/or unlocking gesture is required to regain access to a locked application. Optionally, more than one authenticated stylus is permitted to regain access to an application that was locked by one stylus.

According to some embodiments of the present invention, a stylus transmits an ID signal with a same transmitting element used by the stylus to transmit a location signal. In some exemplary embodiments, information regarding both location and ID of a stylus is transmitted to the computing device. Optionally, the location signal is a burst signal that is transmitted at a defined repetition rate, and an ID signal is a binary code encoded on the location signal and/or is an additional burst signal transmitted in dedicated time slot between location burst signals. Optionally, a stylus only transmits ID responsive to a user command, e.g. with button selection. Optionally, a stylus transmits ID responsive to a request by the computing device and/or associated touch screen. In some exemplary embodiments, stylus additionally includes a security token. Optionally, once a pin number is provided to the host computer, e.g. with the stylus and/or with a key pad, a code on a security token is transmitted. Optionally, transmission is responsive to user command, e.g. button selection.

According to some embodiments of the present invention, a stylus is used to authorize displaying inking and/or annotations added on a text document, presentation, image or any other document or file. The present inventors have found that it may be convenient for a user to be able to add personal and/or private annotations on a soft copy of a document that will not be shared with other users that have access to the document through alternate display platforms and/or have access to the document but not to the stylus. For example, it may be convenient for a user to be able to add notes on a presentation that will be only displayed on the user's personal touch screen even while the document is concurrently being projected on a screen and/or concurrently shared during a web-conference. The present inventors have found that a stylus that is able to interact with a computing device can be used to differentiate between a display platform on which private annotations of a user should be displayed and display platforms on which the private annotations should be filtered so that access to the annotations is denied, unless permission is provided by the user, e.g. the user in possession of the stylus. The present inventors have also found that by restricting the display of such notes and markings to a particular display platform, each of a plurality of users sharing a document can securely add personal markings on a base version of the shared document. Optionally, one or more user groups are defined and members of the groups can share restricted annotations that cannot be viewed by non-members.

According to some embodiments of the present invention, a user can select to add annotations and/or input to a document that will not be shared by others. In some exemplary embodiments, a user selects this option by button selection on a stylus and/or by selecting a virtual button on a touch screen by touching it with a finger or with the stylus. According to some embodiments of the present invention, an ID code of the stylus used to select adding restricted annotations is stored by the computing device interacting with the stylus in association with the annotations added. Optionally, once the stylus ID code is received together with a request to add restricted annotations, a restricted annotation mode is initiated and annotations can be added by the stylus, by finger touch, keyboard and/or mouse and also viewed. Optionally, the restricted annotation mode is terminated by user command.

According to some embodiments of the present invention, restricted annotations are tagged with the stylus ID and are only accessible on a display platform responsive to authorization provided by that stylus. Optionally, authorization by a stylus is obtained by selecting a button on the stylus and/or selecting a button on the display platform with the stylus. Optionally, a user is additionally required to enter a code and/or additional secure information, e.g. biometric input in order to access restricted annotations. Optionally, input provided by a stylus is automatically filtered responsive to transmitting the document by email, to a printer and/or to a display device, e.g. a projector. Optionally, access can be subsequently regained on a touch screen receiving input from the stylus, responsive to entering a user password and/or by user command.

According to some embodiments of the present invention, a stylus is used to identify an author providing annotations to a document, e.g. track changes to a document. According to some embodiments of the present invention, annotations added to a document are associated with a specific user in possession of the stylus, as opposed to a computing device on which the annotations were added. Optionally, once annotation mode is initiated with a particular stylus, annotations can be added by finger touch, mouse, keyboard, voice commands or any other input device or method. By associating the annotations with a specific stylus, a user can add annotations from a plurality of different computer devices and all the annotations provided by that user from the different computing devices will be associated with a same author. Optionally, a time stamps is linked to the annotations added. In addition, plurality of different users, each in possession of their own stylus can add annotations to a document from a same computing device and authoring of the annotations will be differentiated based on the different styluses used to initiate the annotations. Alternatively, a user may use more than one stylus to enter annotations, and the annotations entered with the different styluses will be all visible and differentiated. Optionally, when displaying the annotations, annotations of each author are displayed with a unique color. Optionally, annotations authored by a stylus concurrently interacting with the digitizer will always appear in a same color, e.g. in red.

Reference is now made to FIG. 1 showing a simplified block diagram of an exemplary system providing secured operation with a stylus in accordance with some embodiments of the present invention. According to some embodiments of the present invention, a computing system includes a touch screen and/or a digitizer sensor overlaid on a display 200 that is operable to receive input from a stylus 144. Typically, stylus 144 transmits an AC signal, e.g. in signal bursts at a defined repetition rate that can be picked up by a digitizer and/or touch screen 200. According to some embodiments of the present invention, input received from stylus 144 is processed by a processing unit 130 to track a position of stylus 144 with respect to touch screen 200 and/or to retrieve a stylus ID from the received input. In some exemplary embodiments, location of the stylus is determined with a location detection unit 131 and stylus ID is retrieved with a stylus ID unit 132. Optionally, both location detection unit 131 and stylus ID unit 132 are integrated in a single unit. Typically both location and identity of stylus 144 is reported to a host computer 150 associated with touch sensor 200. Optionally, identity and/or location of stylus 144 are additionally reported to a remote system 160, e.g. a network system. In some exemplary embodiments, stylus identification unit 132 includes memory for storing ID codes of registered styluses, e.g. styluses that have been previously authorized to operate host computer 150.

According to some embodiments of the present invention, location detection unit 131 is operable to determine a location of a stylus and also to track its movement path over time. Optionally, location detection unit 131 additionally includes a gesture identifying capability to recognize a pre-defined gesture performed by a stylus. Alternatively and/or additionally, tracking a movement path and/or identifying a gesture are functions performed by host computer 150.

According to some embodiments of the preset invention, host computer 150 and/or remote system 160 includes an application 151 for registering stylus 144 used to operate host computer 150 and/or remote system 160. Optionally, registration of the stylus on host 150 is performed by firmware in a manufacturing site. In some exemplary embodiments, registration is only required for authorizing the stylus to perform secure operations. Optionally, different levels of authorization can be granted to different styluses.

Optionally, one or more styluses are associated with each user having an account on host computer 150. According to some embodiments of the present invention, application 151 also manages secure operations performed with stylus 144. Alternatively, one or more additional applications in communication with registration application 151 manage one or more secure operations performed with stylus 144. Optionally application 151 is an add-on application that operates in conjunction with other applications running on host 150. In some exemplary embodiments, application 151 receives reports regarding location and identify of a stylus, e.g. a stylus authorized for secure operations, and stores information regarding secured operations performed with stylus 144. Optionally, secure operation is provided based on position and/or tracking information obtained from the stylus as well as the stylus ID retrieved from input provided by the stylus. Optionally, stylus ID transmitted by the stylus is a dynamic code and application 151 includes an algorithm to authenticate or verify the dynamic code.

According to some embodiments of the present invention, prior to granting a request to perform a secure operation, authorization of a stylus ID associated with the request is verified by host computer 150 and/or remote system 160. Optionally, for specific operations, additional verification is requested by application 151 so that an identity of user in possession of stylus 144 is also verified.

In some exemplary command, stylus 144 periodically reports stylus ID to host computer 150 and/or remote system 160 during a course of interaction with host 150. Optionally, stylus ID is only reported to the host while the stylus is touching, e.g. pressed against the touch screen and is not reported while the stylus is hovering over the touch screen. Optionally, retrieving stylus ID is performed using a protocol initiated by an application on host 150 and/or by user command to the stylus.

Figure 2:
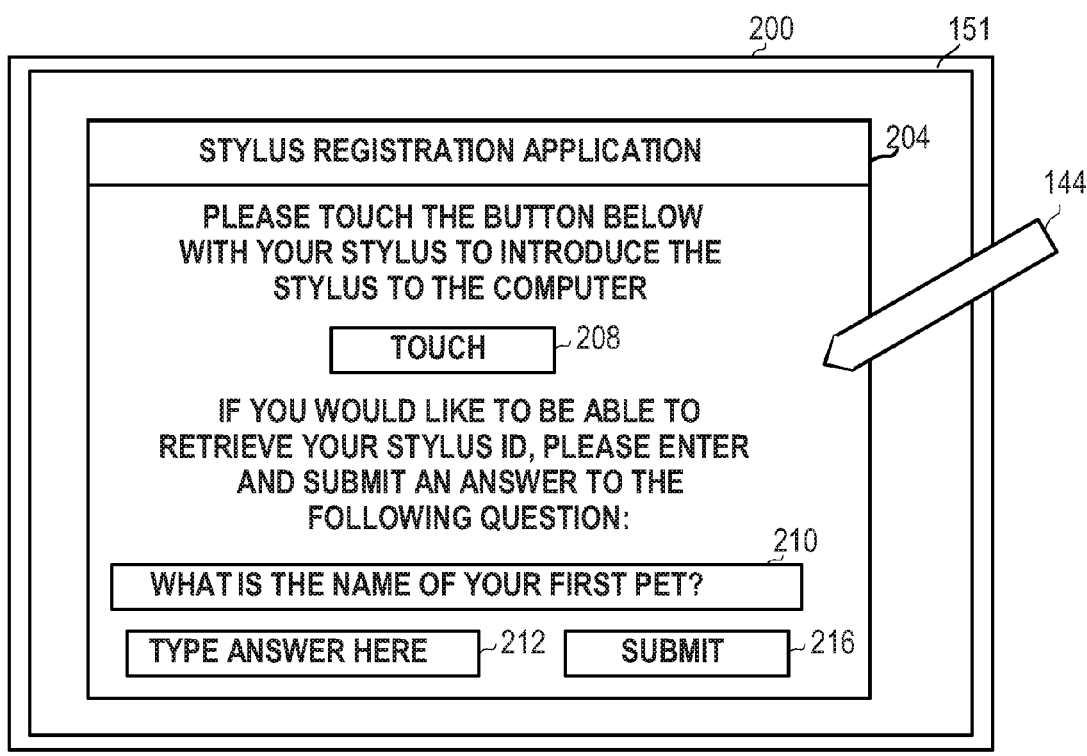
FIG. 2 is an exemplary schematic drawing of a stylus interacting with a user interface for registering a stylus with a computing device, in accordance with some embodiments of the present invention.

Reference is now made to FIG. 2 showing an exemplary schematic drawing of a stylus interacting with a user interface for registering a stylus with a computing device in accordance with some embodiments of the present invention. According to some embodiments of the present invention, when a stylus is first introduced to a computing device, e.g. host computer 150 (FIG. 1), application 151 for registering the stylus is initiated. Typically, a stylus is introduced to a computing device when stylus input is detected by the touch screen and reported to the computing device. Optionally, application 151 for registering a stylus is only initiated for the first stylus introduced to the computing device and registration of additionally styluses is initiated by user command. Typically, a stylus can be registered in multiple computer platforms and/or multiple styluses can be registered in one computer platform.

In some exemplary embodiments, application 151 displays a dialog box 204 requesting that a user touch the touch screen in a designated location and/or area 208 so that the stylus ID can be retrieved. Typically, when the stylus touches area 208, stylus ID is retrieved by the touch screen and reported to the registration application. Optionally, a designated location for touching the touch screen with the stylus is not required and the stylus ID can be retrieved as long as the stylus is touching the touch screen and/or is brought in proximity to the touch screen, e.g. to hover over the touch screen. Typically, stylus ID is stored in a defined location, e.g. a secure file that can be access by application 151.

According to some embodiments of the present invention, in addition to retrieving the stylus ID, application 151 requests information to verify the user's ID by asking one or more questions 210, requesting a password, requesting that the user perform a gesture with the stylus and/or requesting biometric information. Optionally, a user can provide the answers and/or other information in a designated location 212 and complete the registration procedure by pointing or clicking submit button 216. Answers provided by the user may be provided with the stylus and/or with other input devices, such as a keyboard, finger touch and/or mouse. Optionally, a user is permitted to enter a user selected question and answer. Typically, once button 216 is selected, the stylus ID together with the user's information, e.g. answers to questions is stored in memory on host computer and/or on a network storage device and can be accessed by application 151.

In some exemplary embodiments, if the stylus is not available, application 151 provides an alternative option of verifying ID of the user to gain authorization typically given to the stylus, e.g. in case the stylus is lost, stolen and/or is malfunctioning. Optionally, application 151 retrieves the stylus ID so that a user can manually enter the stylus ID when performing a secure operation. Additionally or alternatively, information requested to verify ID of the user is later used to authorize specific operations that require both verifying the authorization of the stylus and verifying the authorization of the user.

It will be appreciated that one or more actions which may be performed by the stylus may be conditioned on pre-registration of the stylus with the host. In such case, if a user has a new stylus, the only application in which he can use the stylus is the stylus registration application. In other embodiments, only certain actions, such as locking the computer or locking some applications or documents can be conditioned on pre-registering the stylus.

Figure 3A:
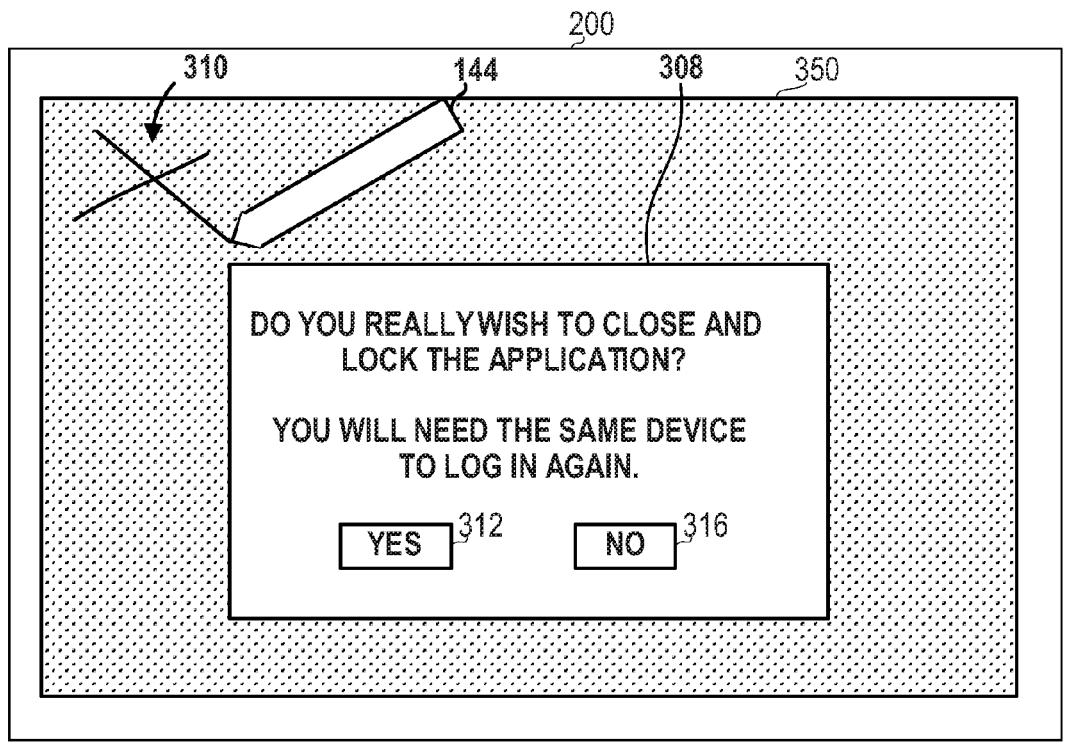
FIG. 3A is an exemplary schematic drawing of a stylus interacting with a user interface for locking an application, in accordance with some embodiments of the present invention.

Reference is now made to FIG. 3A showing an exemplary schematic drawing of a stylus interacting with a user interface for locking an application in accordance with some embodiments of the present invention. According to some embodiments of the present invention, during interaction with an application 350 displayed on a touch screen 200, input from stylus 144 is received by host 150 in the form of pre-defined gesture performed by stylus 144 for locking application 350, e.g. so that other users cannot access application 350. Optionally, stylus performs an "X" gesture 310 that is recognized by a processing unit associated with touch screen 200, e.g. processing unit 130 and/or host 150, and input regarding recognition of the gesture and/or a command to lock application 151 is forwarded to application 350. It will be appreciated that the disclosure is not limited to the particular gesture or a particular location on the screen. Optionally, the pre-defined locking gestures defines an item displayed on touch screen 200 to be locked, e.g. "X" gesture 310 is pre-defined to lock an open application and a "V" gesture is pre-defined to lock a specific file that is open in application 151.

Typically, a stylus ID from a stylus performing the gesture is also forwarded to application 350. Optionally, the locking procedure is managed by an independent application, e.g. application 151 running in parallel with application 350. In some exemplary embodiments, responsive to receiving a command to lock application 350, a dialogue box 308 is opened to confirm the locking request and a user can select to continue with the locking procedure by selecting a YES button 312 or can select to cancel locking by selecting a NO button 316. Optionally, a stylus ID is retrieved when the user selects a YES button 312 and is stored in association with the locking command. It is noted that the disclosure is not limited to locking applications and a same or similar system and method may be applied to locking access to documents, files, emails, games, images, or the like.

Figure 3B:
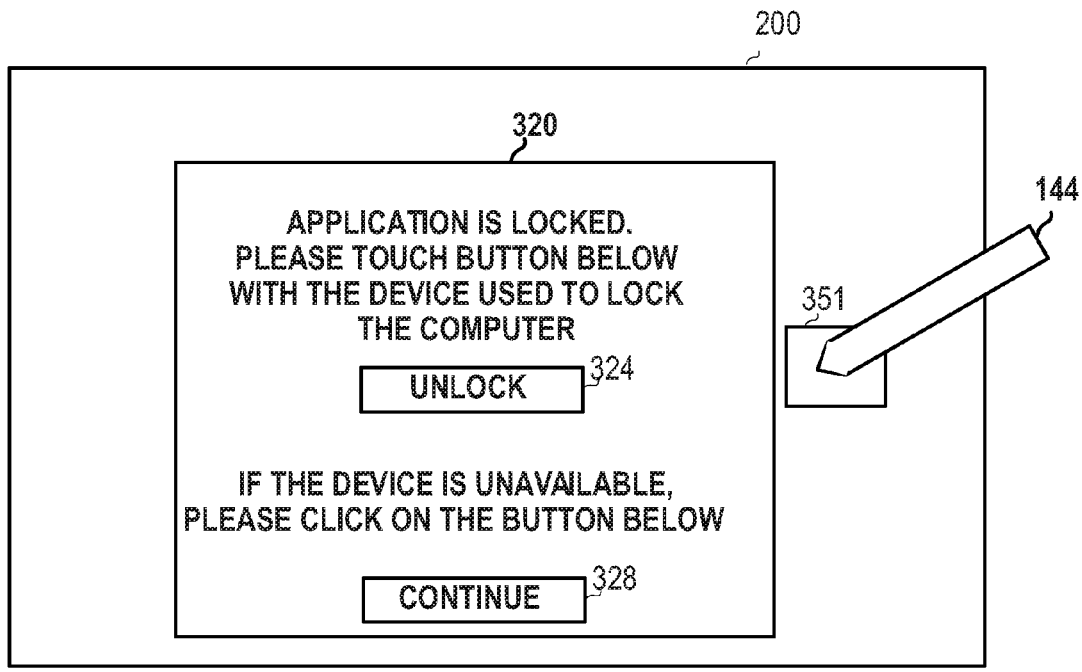
FIG. 3B is an exemplary schematic drawing of a stylus interacting with a user interface for unlocking an application, in accordance with some embodiments of the present invention.

Reference is now made to FIG. 3B showing an exemplary schematic drawing of a stylus interacting with a user interface for unlocking an application in accordance with some embodiments of the present invention. According to some embodiments of the present invention, a user can subsequently unlock an application by introducing stylus 144 to a location associated with application 350, e.g. a thumbnail 351 on a desktop of a touch screen and/or by providing a command to open application 350 with stylus 144. According to some embodiments of the present invention, recognition of stylus 144 in the vicinity of the locked application prompts displaying a dialog box 320. Optionally, display of dialog box 320 is prompted by a dedicated application for managing secure operations with stylus 144. Alternatively, an attempt to start application 350 prompts the display of dialog box 320. Optionally, dialog box 320 informs the user that the application is locked. In some exemplary embodiments, in order to unlock the application, a user is requested to select button 324, so that the stylus ID can be retrieved from that location. The retrieved stylus ID is compared with the stylus ID used to lock the application. According to some embodiments of the present invention, if there is a match between the ID requesting unlocking and the ID associated with the locking, the unlocking command is executed. Optionally, unlocking can also be performed by an additional stylus with assigned and/or designated privileges to override secure operations performed by other styluses or by a particular stylus. Optionally, once a match is found, dialog box 320 displays a request for additional information to verify the user in possession of stylus 144, e.g. request a response to a stored question and/or requests input of a stored password.

In some exemplary embodiments, a user may select button 328, e.g. with finger touch in case the stylus required for the unlocking is unavailable and/or is malfunctioning. Typically, in response to selection, dialog box 320 requests additional information to verify the user making the request. Optionally, a user can retrieve a stylus ID in response to verifying the user's identity and may enter the stylus ID to regain access to an application.

Figure 4A:
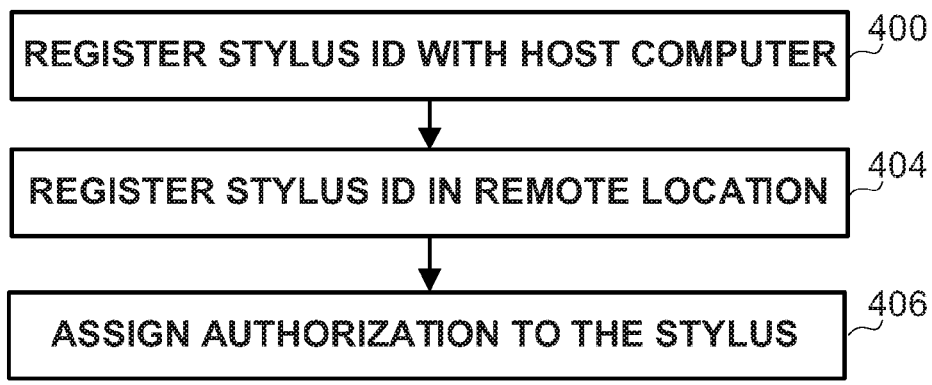
FIG. 4A is a simplified flow chart of an exemplary method for registering a stylus providing secure operation of a computing device, in accordance with some embodiments of the present invention.

Reference is now made to FIG. 4A showing a simplified flow chart of an exemplary method for registering a stylus for providing secure operation with a computing device in accordance with some embodiments of the present invention. According to some embodiments of the present invention, a stylus is registered with a host computer during a dedicated registration procedure (block 400). Optionally, a registration procedure is performed with a registration application installed on the computing device. Optionally, the registration application is initiated automatically when the computing device detects input from a stylus that is not registered. Optionally, a user initiates a registration application. In some exemplary embodiments, registration information stored with the host computer is transmitted and stored in a remote location such as a network server so that the stylus can be fully operated in a plurality of different computing devices and/or stations (block 404). According to some embodiments of the present invention, a registration application can assign different levels of permission to styluses (block 406). Optionally, the first stylus that is registered on a computing device has the highest level of authority, e.g. the master stylus and authority provided to the other styluses is determined by the master stylus.

Figure 4B:
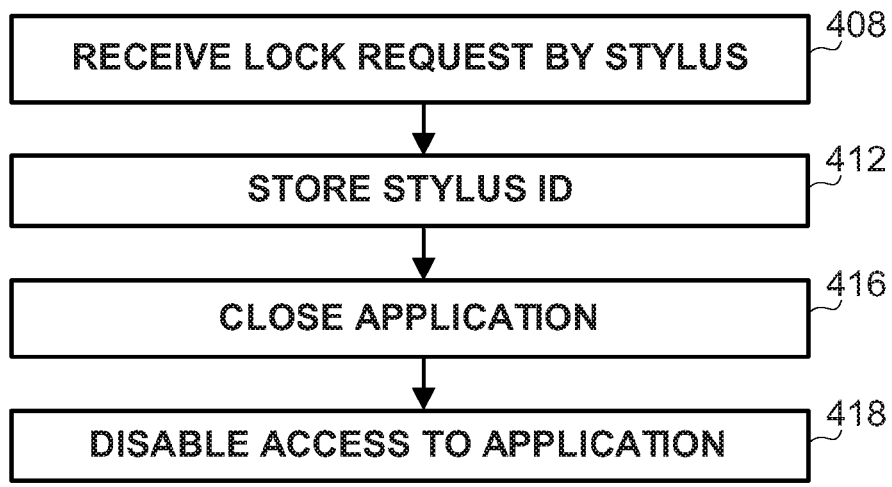
FIG. 4B is a simplified flow chart of an exemplary method for locking an application with a stylus, in accordance with some embodiments of the present invention.

Reference is now made to FIG. 4B showing a simplified flow chart of an exemplary method for locking an application with a stylus in accordance with some embodiments of the present invention. According to some embodiments of the present invention, a stylus interacting with a computing device can provide a lock request to an application by performing a gesture in an area occupied by the application and/or in another designated area. According to some embodiments of the present invention, when a lock request by a stylus is received and/or identified (block 408), an ID of a stylus is detected and stored (block 412). Optionally, the ID of the stylus is checked against a list of registered styluses. Typically, only a registered stylus is authorized to lock an application. Optionally, prior to accepting a lock request, confirmation is requested. Optionally, a dialog box requesting verification is opened and a user is requested to verify by selecting a button and/or by providing additional identification, e.g. a password. According to some embodiments of the present invention, once a locking request is granted, the application is closed (block 416) and access to the application is denied (block 418). According to some embodiments of the present invention, a similar procedure is applied for locking a document, email, image, file, entries in a table, game and/or folder and/or locking general access to a plurality of items within a document, plurality of applications and/or all the applications on the computing device.

Figure 4C:
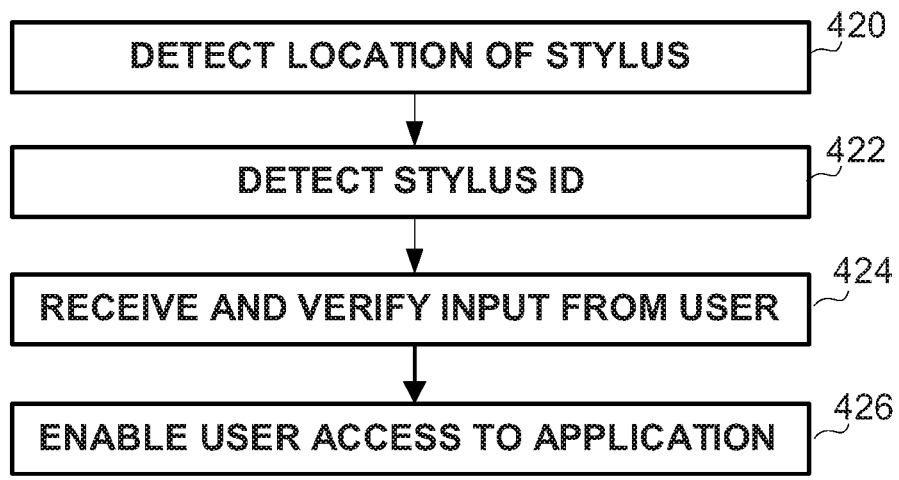
FIG. 4C is a simplified flow chart of an exemplary method for unlocking an application with a stylus, in accordance with some embodiments of the present invention.

Reference is now made to FIG. 4C showing a simplified flow chart of an exemplary method for unlocking an application with a stylus in accordance with some embodiments of the present invention. According to some embodiments of the present invention, a same stylus used to lock an application is required for unlocking the application. According to some embodiments of the present invention, a location of a stylus is detected (block 420) and if the stylus is found to be in the vicinity of the locked application and/or a command to open the application is received, an ID of the stylus is detected and checked against an ID used to lock the application (block 422). Optionally, once the stylus ID is verified, e.g. found to match the ID used to lock the application, an additional code, gesture and/or information is requested to verify that the user in possession of the stylus is an authorized user (block 424). According to some embodiments of the present invention, verification of provided input enables access to the locked application (block 426).

Figure 5:
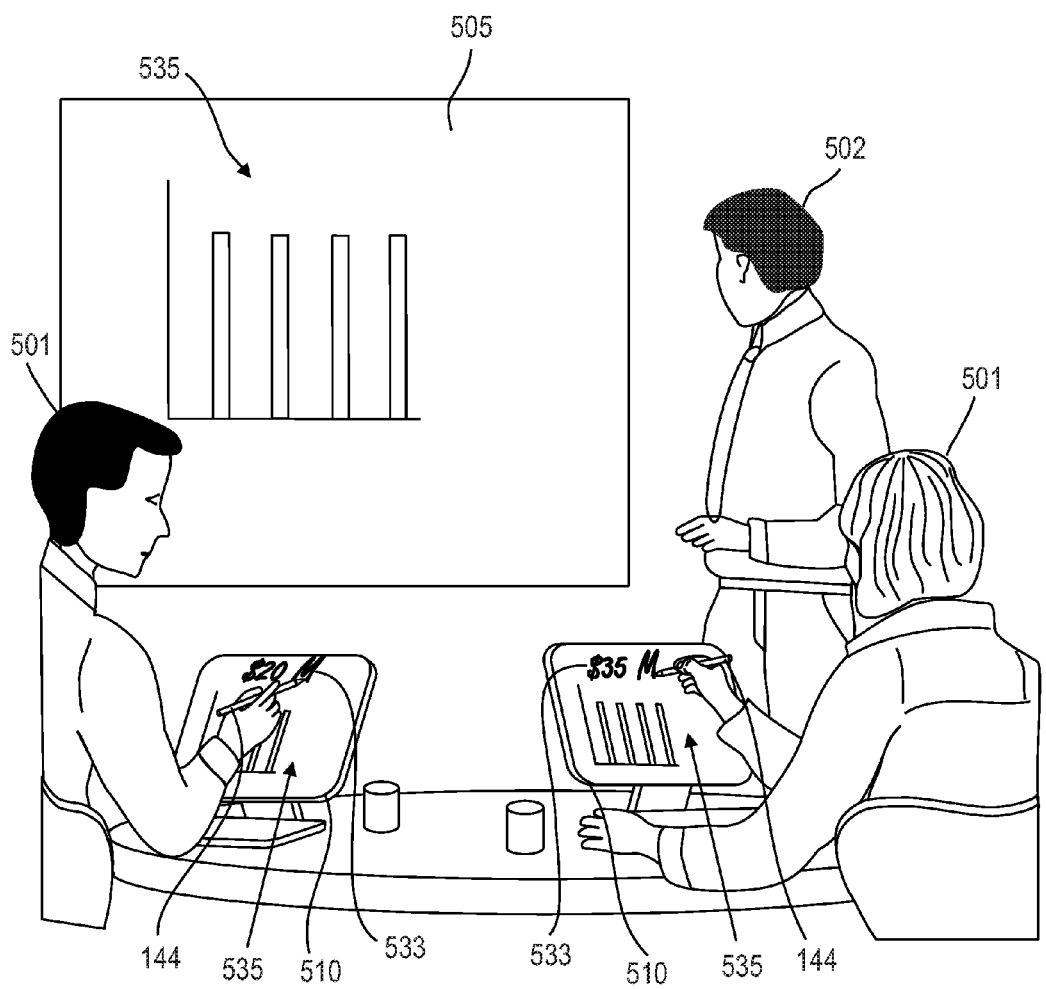
FIG. 5 is a simplified schematic drawing showing restricted annotations added to a shared document, in accordance with some embodiments of the present invention.

Reference is now made to FIG. 5 showing a simplified schematic drawing of restricted annotations added to a shared document in accordance with some embodiments of the present. According to some embodiments of the present invention, a system provides for adding annotations 533 to a document 535, which are only displayed on a display platform receiving input from the stylus associated with the annotations. Optionally, permission to display the annotation on additional display platforms may be authorized with stylus 144. Optionally, annotations can be added and/or displayed on a document while the document is being shared by others, e.g. while the document is displayed on a screen 505 with a projector. In some exemplary embodiments more than one user can add annotations 533 to a shared document 535, such that annotations 533 will not be displayed to others unless permission is granted. Optionally, annotations 533 by default will not be displayed on a document that is transferred by email and/or is printed. Typically, a user can retrieve the annotations on any display platform to which the stylus associated with the annotations is introduced. Optionally, a user may lock access to the annotations by performing a predefined gesture with the stylus, e.g. terminate displaying the annotations. In some exemplary embodiments, a gaming application provides for adding restricted input during gaming. For example, one or more users sharing a gaming application can enter input that is not displayed to other players unless permission is obtained using the stylus providing the input.

Figure 6:
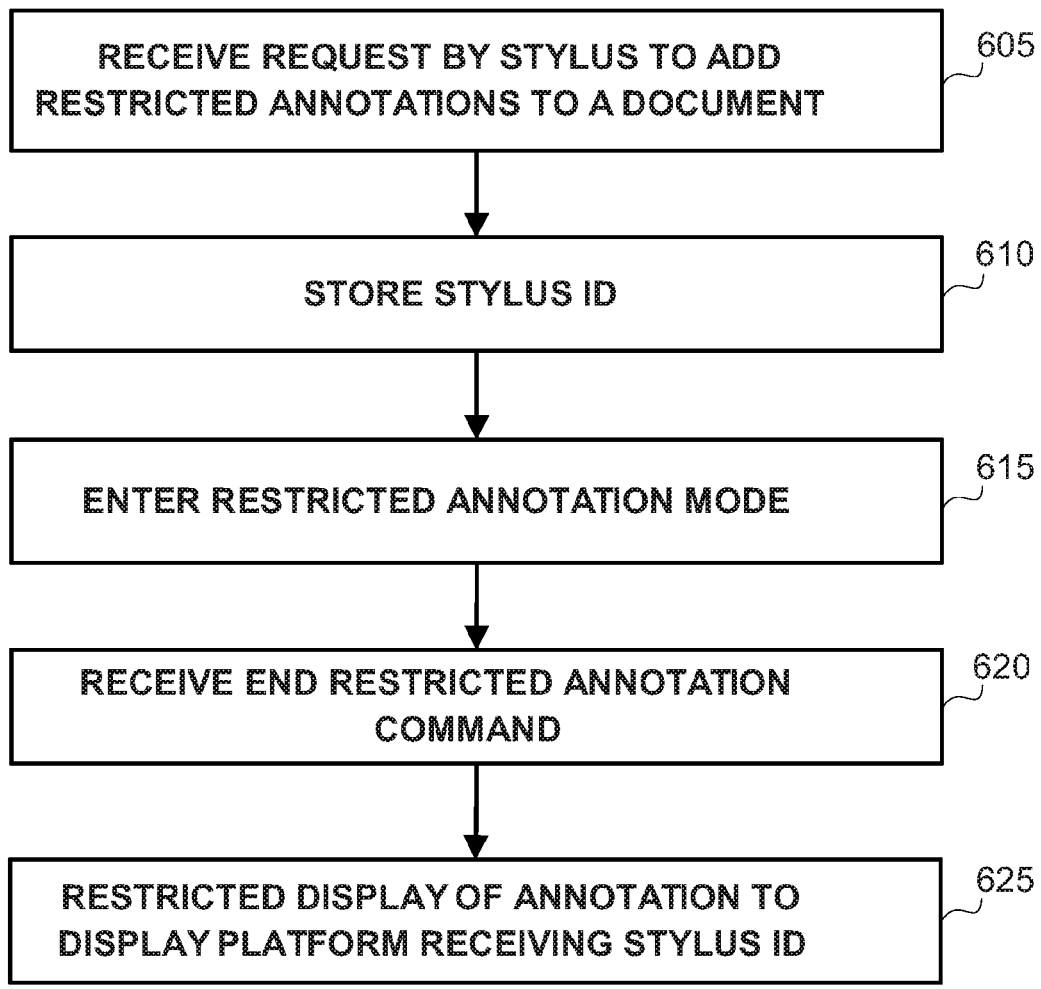
FIG. 6 is a simplified flow chart of an exemplary method for adding restricted annotations to a document, in accordance with some embodiments of the present invention.

Reference is now made to FIG. 6 showing a simplified flow chart of an exemplary method for adding restricted annotations to a document in accordance with some embodiments of the present invention. According to some embodiments of the present invention, an application receives a request and/or command to add restricted annotations to a document from a stylus to a drop down menu and/or a virtual button (block 605). According to some embodiment of the present invention, responsive to receiving the command from the stylus, the stylus ID is detected and stored so that it can be associated with the annotations to be provided (block 610). According to some embodiments of the present invention, once the stylus ID is detected, the application enters a restricted annotation mode that allows a user to add a layer of virtual ink which is secured and can only be displayed on authorized displays (block 615). Optionally, only a stylus that is registered on a computing device is permitted to enter annotations in restricted annotation mode. According to some embodiments of the present invention, a restricted annotation mode is terminated responsive to user command and/or closing of the application (block 620). According to some embodiments of the present invention, annotations added during a restricted annotation mode are only displayed when the document is displayed on a computing device and/or display platform that is authorized by the stylus (block 625). According to some embodiments of the present invention, authorization by a stylus is provided responsive to the stylus being introduced to the computing device. Optionally, in addition to introducing the stylus to the computing device, an additional password or gesture and/or confirmation from the user is also required for the annotations to be displayed. In some exemplary embodiments, access to the annotations can be retrieved without a stylus, by providing answers to questions that were previously stored in a registration procedure (FIG. 2).

Figure 7:
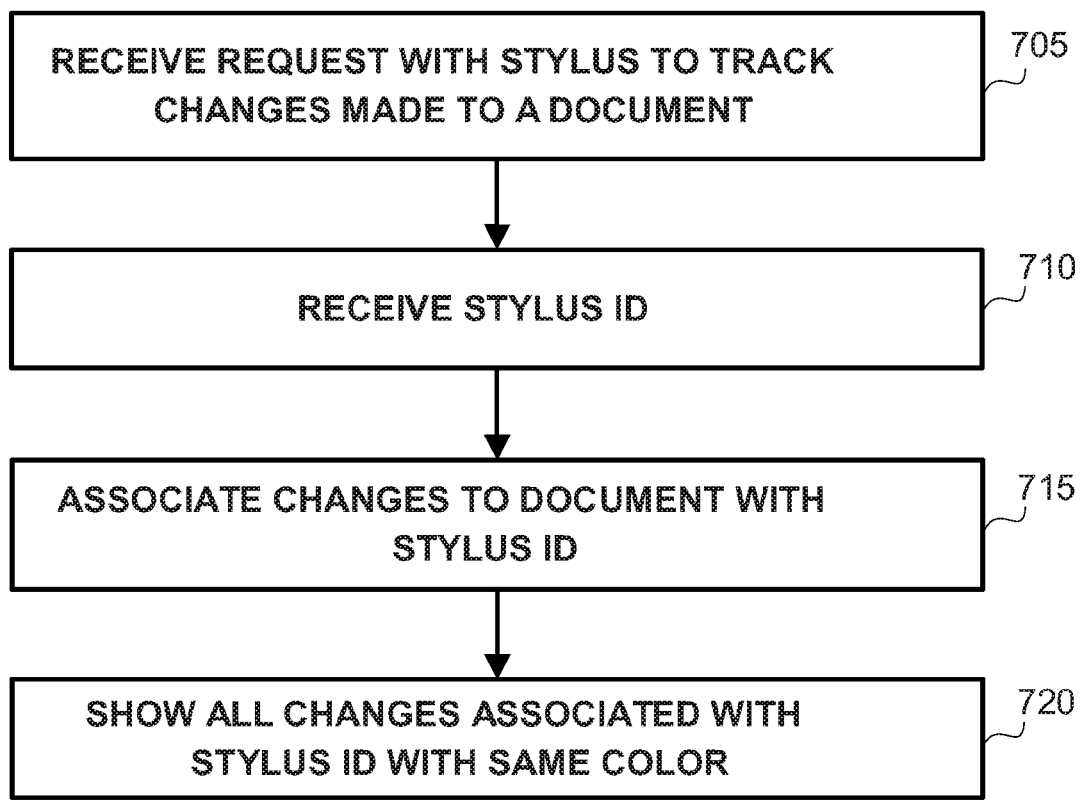
FIG. 7 is a simplified flow chart of an exemplary method for associating changes made to a document to an author with a stylus, in accordance with some embodiments of the present invention.

Reference is now made to FIG. 7 showing a simplified flow chart of an exemplary method for associating changes made to a document by an author with a stylus, in accordance with some embodiments of the present invention. According to some embodiments of the present invention, an application receives input from a stylus requesting to track changes made to a document (block 705). Typically, the request is made by a stylus pointing at a drop down menu and/or a virtual button displayed on the application. According to some embodiments of the present invention, responsive to receiving the request from a stylus, the stylus ID providing the command is stored and used to associate the changes with a particular stylus and/or user associated with the stylus (block 710). Optionally, once the stylus ID is detected, a user may continue to use the stylus to enter changes to the document and/or may enter changes with a keyboard, finger touch, and/or mouse. All changes tracked in the document will be associated with the stylus ID that was detected (block 715). Optionally, a user may transfer the document to an alternate computing device and continue adding changes in track changes. Typically, when reopening the document in another computing device, a user will again select the track changes mode with the stylus so that the additional changes will also be associated with the stylus. According to some embodiments of the present invention, all tracked changes associated with a stylus ID, are shown in a same color, font, font size or the like, regardless of the computing device on which the changes were made (block 720).

Figure 8:
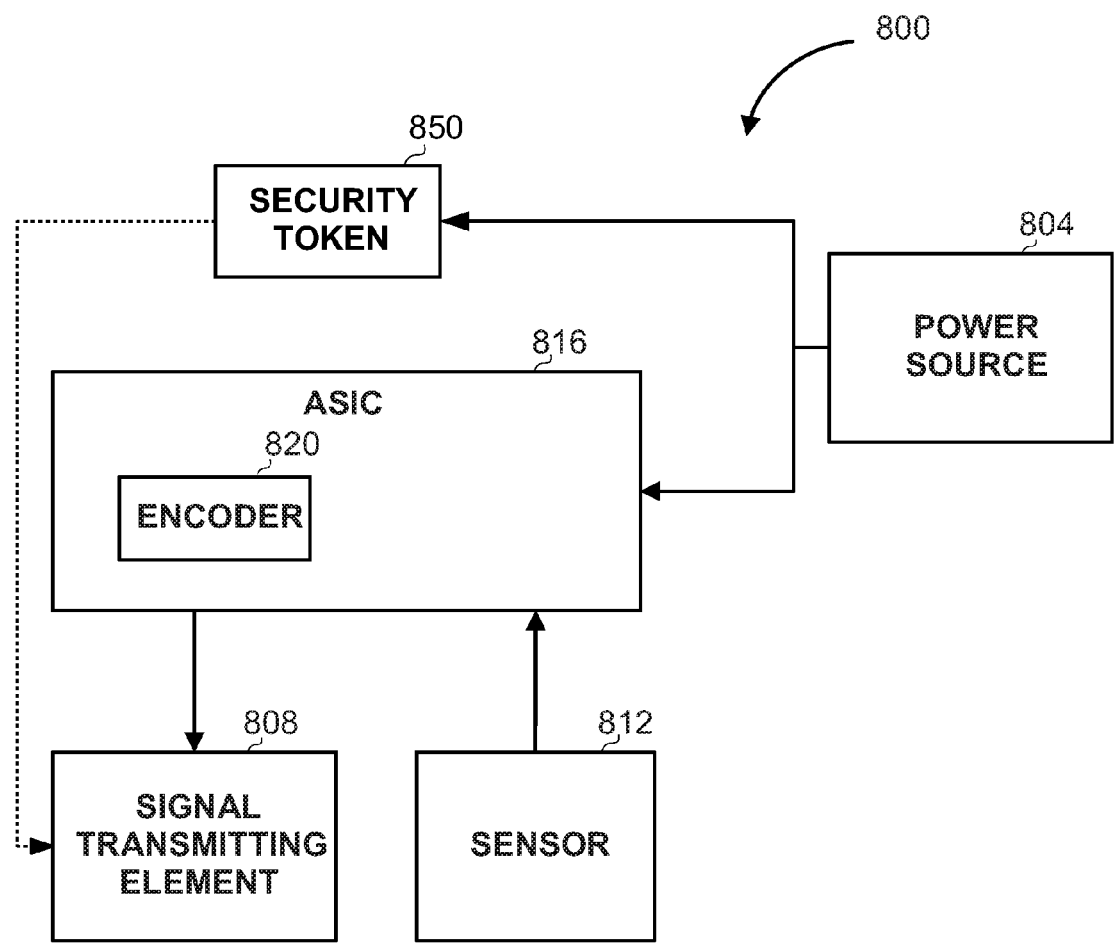
FIG. 8 is a simplified block diagram of exemplary circuitry included in a stylus for providing secure operation with a computing device, in accordance with some embodiments of the present invention.

Reference is now made to FIG. 8 showing a simplified block diagram of exemplary circuitry included in a stylus for providing secure operation with a computing device, in accordance with some embodiments of the present invention. According to some embodiments, a stylus 144 includes circuitry and/or electrical components 800 that provide for transmitting a signal and/or information from the stylus. According to some embodiments of the present invention, components 800 include a power source 804 for powering operation of the stylus, an ASIC 816 including circuitry for operating the stylus, at least one signal transmitting element 808 through which a signal is transmitted, an optional sensor 812 for sensing pressure applied on a writing tip of the stylus, and an optional security token 850 for enhancing secure operation with the stylus.

According to some embodiments of the present invention ASIC 816 provides functionality of a transmitting unit and includes circuitry for generating a signal to be transmitted by signal transmitting element 808. Optionally, ASIC 816 generates one or more encoded signals 820 including ID code and/or stylus status information, e.g. pressure sensed by sensor 812, operational state of switches included in stylus and/or battery life status. According to some embodiments of the present invention, ASIC 816 stores a unique ID code for the stylus and generates the encoded ID signal based on the stored code. Optionally, the ID code is burned on one or more registers in ASIC 816 with firmware of the stylus during manufacturing. Optionally, encoding is by one or more of amplitude shift keying (ASK), frequency shift keying (FSK) and phase shift keying (PSK). According to some embodiments of the present invention ASIC 816 generates burst signals that are transmitted at a predefined repetition rate. Typically, the burst signals are AC signals or any other alternating signals. In some exemplary embodiments, the ID code is encoded on a burst signal that is transmitted for the purpose of locating the stylus. Alternatively, the ID code is a separate signal that is transmitted, for example, in between transmission of burst signals that are transmitted for the purpose of locating the stylus, According to some embodiments of the present invention, a stylus may additionally include a security token and/or an authorization token 850 as is known in the art. Optionally, a code generated by security token 850 is transmitted by transmitting element 808. Optionally, the code generated by security token 850 is in addition to the ID code generated by ASIC 816.

According to some embodiments of the present invention, signal transmitting element 808 is a conductive portion of a writing tip and/or is a conductive element proximal to the writing tip so that the location sensed from the signal transmitted by the stylus is that of the writing tip. In some exemplary embodiments, a sensor 812 senses pressure and/or displacement of the writing tip responsive to pressure and the measurement is used to differentiate between a stylus hovering over an interacting surface and a stylus touching the interacting stylus, as when entering data. Optionally, a pressure sensitive mechanism such as sensor 212 may be a mechanical mechanism, an optical mechanism and/or another mechanism. Optionally, the pressure applied is in the range of 0-2K gram-force, e.g. 0-350 gram-force. In some exemplary embodiments, a stylus transmits an ID code responsive to sensing a threshold pressure applied on the tip, e.g. a threshold pressure typically associated with or exceeding a touch operational state of the stylus.

Optionally, power source 804 includes a 4A alkaline battery, lithium battery and/or a super capacitor. In other embodiments, a rechargeable battery is used, and in further embodiments the rechargeable battery is charged by an excitation coil surrounding the sensor array. Optionally, the stylus further comprises a voltage stabilizer (not shown) to ensure that the voltage provided by the power source is constant over time.

In some exemplary embodiments, the stylus may support full "mouse" functionality. For example, pressing the tip against interacting surface, e.g. a touch screen provides the functionality of mouse left click, pressing a side switch of the stylus provides the functionality of a mouse right click, and cursor tracking is provided when the stylus is hovering above the screen. Optionally, the stylus can further comprise an eraser side switch or eraser tip.

According to some embodiments of the present invention, a code generated by security token 850 and/or ID code generated by ASIC 816 and transmitted by the stylus is used to gain access to locked rooms and/or office equipment such as printers, candy machines, coffee machines and/or to access a personal account in cafeteria and/or food store.

Figure 9:
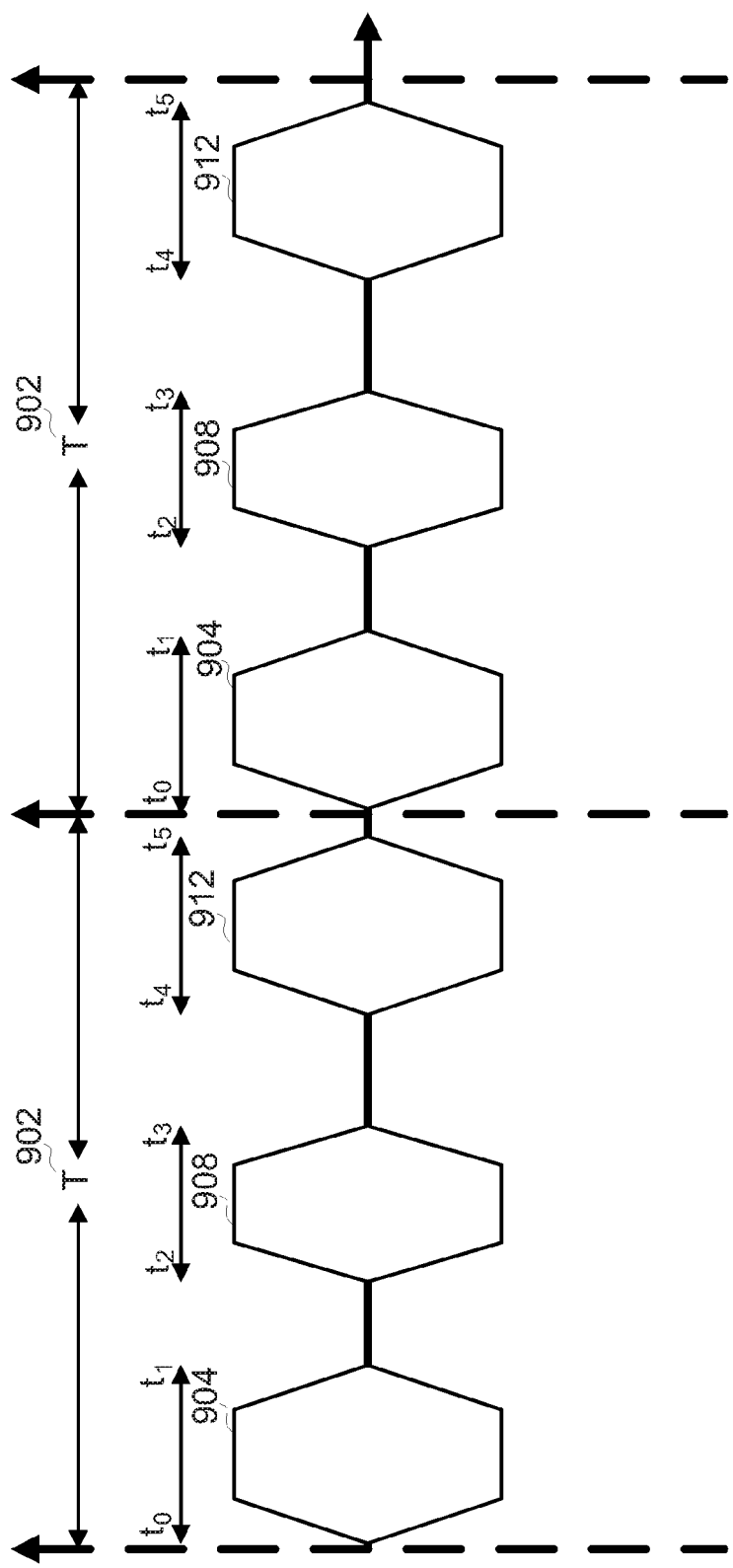
FIG. 9 is a simplified schematic drawing of exemplary burst signals transmitted by a stylus providing secure operation with a computing device, in accordance with some embodiments of the present invention.

Reference is now made to FIG. 9 showing a simplified schematic drawing of exemplary burst signals transmitted by a stylus for providing secure operation with a computing device in accordance with some embodiments of the present invention. According to some embodiments of the present invention, a stylus 144 transmits over or more burst signals, e.g. burst signals 904, 908 and 912 over a transmission cycle 902 that is repeated at a predefined repetition rate. Optionally, a transmission cycle is between 5-100 msec, e.g., 15 msec and each signal burst is transmitted over a portion of the cycle.

In some exemplary embodiments, a plurality of signal bursts is transmitted over a transmission cycle. Typically, one of the signal bursts is a beacon signal 904 that is used by a digitizer to locate the stylus in relation to the touch screen. Optionally, the beacon signal is transmitted between times t0 and t1 of each cycle, and once detected the digitizer may synchronize its cycle with the stylus cycle. In some exemplary embodiments, an additional signal burst 908 provides a pressure indicator signal. Typically, signal burst 908 is an encoded signal providing information regarding a level of pressure exerted on stylus tip as detected by sensor 812 (FIG. 8). Typically, the pressure indicator signal is transmitted at a constant time frame within each cycle, e.g. between t2 and t3. Optionally, the signal burst 908 has a repetition rate that is other than the repetition rate of the beacon signal 904. Optionally, during a hover operational state, signal burst 908 is only transmitted once every other cycle 902 and during a touch operational state, signal burst 908 is transmitted once a cycle 902.

According to some embodiments of the present invention, an additional signal burst 912 provides an ID code. In some exemplary embodiments, additional signal burst 912 is an encoded signal that provides one or more bits of a binary code at a time, e.g. one or more bits of a binary code per transmission cycle. Typically, encoding is provided by one of ASK, FSK and PSK. Typically, the length of the binary code is pre-defined and may be between 2-12 bits, e.g. 2-6 bits. Optionally, one bit of the binary code is transmitted per cycle 902 and then the transmission of the binary code is ceased over one or more cycles before transmitting the code again, one cycle at a time. Optionally, signal burst 912 is only transmitted during a touch operational state of the stylus. Optionally, signal burst 912 is only transmitted responsive to a user command, e.g. button selection on the stylus. Optionally, signal burst 912 is transmitted between signal burst 904 and signal burst 908. Optionally, binary code provided by signal burst 912 is encoded in signal burst 904 and a separate signal burst is not required. Optionally, code generated by a security token 850 (FIG. 8) is transmitted in a separate dedicated signal burst over a cycle 902.

Figure 10:
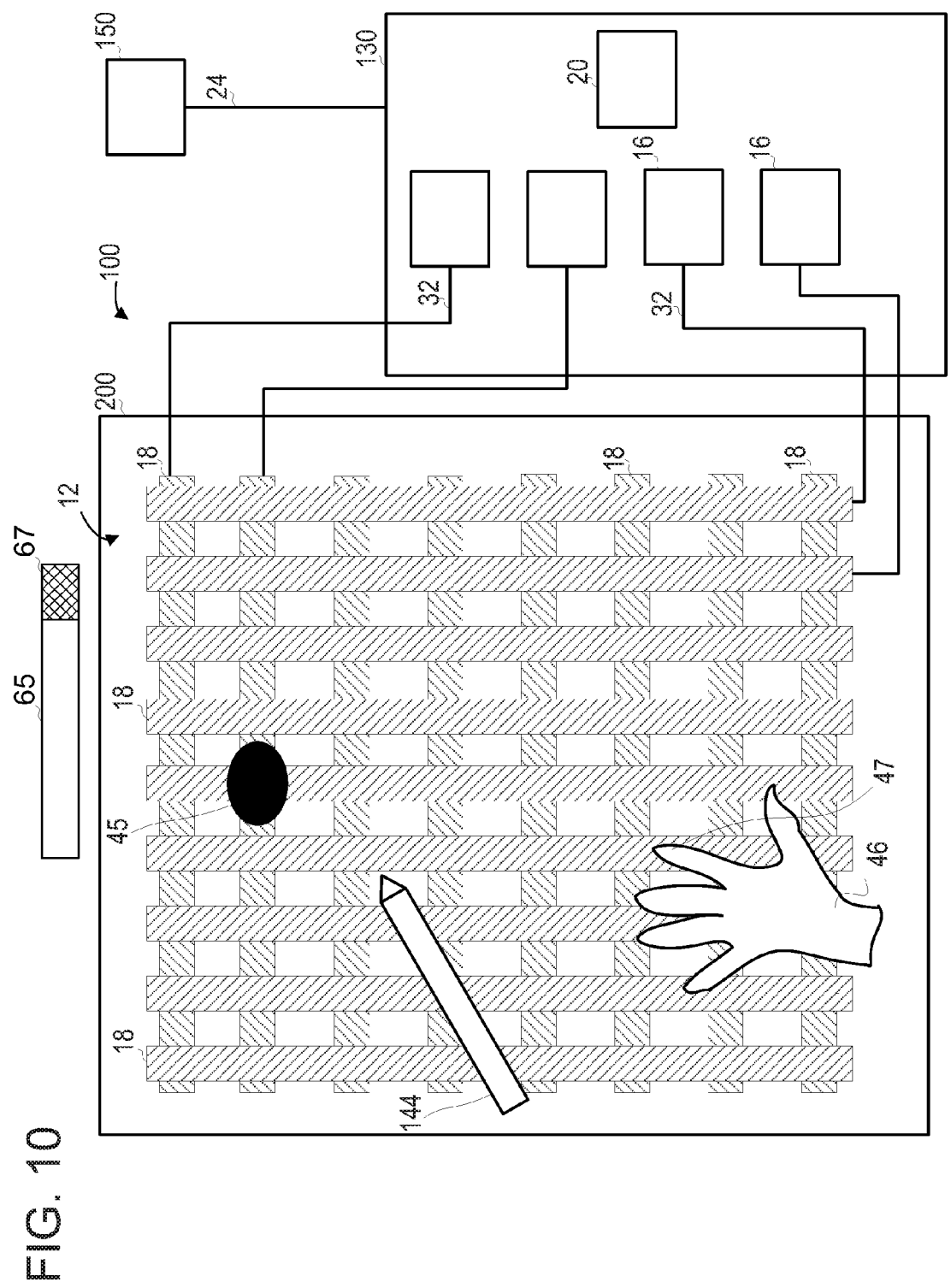
FIG. 10 is a simplified schematic drawing of an exemplary digitizer system operable to provide secure operation with a stylus, in accordance with some embodiments of the present invention.

Reference is now made to FIG. 10 showing a simplified schematic drawing of an exemplary digitizer system operable to provide secure operation with a stylus in accordance with some embodiments of the present invention. The digitizer system 100 may be suitable for any computing device that enables interactions between a user and the device, e.g. mobile computing devices that include, for example, FPD screens. Examples of such devices include Tablet PCs, pen and/or touch enabled lap-top computers, PDAs or any hand held devices such as palm pilots, mobile phones, navigations systems or any other devices that facilitate electronic gaming. According to some embodiments of the present invention, the digitizer system comprises a sensor 12 including a patterned arrangement of conducting lines, which is optionally transparent, and which is typically overlaid on a display 200, e.g. FPD. Typically sensor 12 is a grid based sensor including horizontal and vertical conductive lines 18. Typically, non-contact exists between conductive lines 18. Typically the sensor provides for capacitive touch detection and also provides for receiving signals transmitted by stylus 144.

According to some embodiments of the present invention, circuitry is provided on one or more PCB(s) 30. According to some embodiments of the present invention, one or more ASICs 16 positioned on PCB(s) 30 and electrically connected by connection 32 to one or more conductive lines 18 comprises circuitry to sample and process the sensor's output into a digital representation. The digital output signal is forwarded to a digital unit 20, e.g. digital ASIC unit also on PCB 30, for further digital processing. According to some embodiments of the present invention, digital unit 20 together with ASIC 16 serves as the controller of the digitizer system and/or has functionality of a controller and/or processor. Optionally, each ASIC 16 provides circuitry to stimulate, sample and process output from sensor 12 to digital representation. Optionally, ASIC 16 provides circuitry to stimulate and/or provide input to stylus 144. According to some embodiments of the present invention, digital unit 20 together with ASIC 16 includes memory and/or memory capability. Memory may include one or more of volatile and non-volatile memory, e.g. FLASH memory. Output from the digitizer sensor is forwarded to a host 150 via an interface 24 for processing by the operating system or any current application.

According to some embodiments of the invention, digital unit 20 receives the sampled data from ASIC 16, reads the sampled data, processes it and determines and/or tracks the position of physical objects, such as a stylus 144, a finger 47, a hand 46, and/or a conductive token 45 touching the digitizer sensor from the received and processed signals. According to some embodiments of the present invention, digital unit 20 determines the presence and/or absence of physical objects, such as stylus 144, finger 47, and/or token 45 over time. Calculated position is sent to the host computer via interface 24. According to some embodiments of the present invention, digital unit 20 identifies stylus 144 based on encoded signals transmitted by stylus 144, e.g. analog encoded signals. In some exemplary embodiments of the present invention hovering position of an object, e.g. stylus 144, finger 47 and hand 46, is also detected and processed by digital unit 20. According to some embodiments of the present invention, ID information provided by stylus 144 is also sent to host computer 150 via interface 24.

According to some embodiments of the invention, host 150 includes at least a memory unit and a processing unit to store and process information obtained from ASIC 16, digital unit 20. According to some embodiments of the present invention memory and processing functionality may be divided between any of host 150, digital unit 20, and/or ASIC 16 or may reside in only host 150, digital unit 20 and/or there may be a separated unit connected to at least one of host 150, and digital unit 120. According to some embodiments of the present invention, one or more tables and/or databases may be stored to record data and/or outputs, e.g. registration of authorized styluses.

According to some embodiments of the present invention, digitizer system 100 includes a stylus garage 65 for storing stylus 100 while not being used. Optionally, stylus garage 65 includes a charger 67 for charging a battery of stylus 100. Optionally, stylus 144 is operable to transmit ID information while stored in stylus garage 65 and/or to authorize secure operations.

Digitizer systems used to detect stylus and/or finger tip location may be, for example, similar to digitizer systems described in incorporated U.S. Pat. No. 6,690,156, U.S. Pat. No. 7,292,229 and/or U.S. Pat. No. 7,372,455. Additionally, styluses may be, for example, similar to styluses described in incorporated US Patent Application Publication No. 20080128180. Embodiments of the present invention will also be applicable to other digitizer systems and/or touch screens known in the art, depending on their construction. Embodiments of the present invention will also be applicable to other digitizer sensors known in the art, e.g. sensors comprising loop coils. According to some exemplary embodiments, stylus 144 is operable to be used with a capacitive touch screen. Optionally, stylus 144 can be added as a stand-alone product to an existing capacitive touch screen that includes circuitry that supports stylus interaction.

The terms "comprises", "comprising", "includes", "including", "having" and their conjugates mean "including but not limited to".

The term consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device comprising:
a display;
a digitizer sensor configured to detect input from a signal emitting stylus;
a circuit associated with the digitizer sensor and configured to:
recognize a pre-defined gesture performed by a stylus on the touch screen that displays a plurality of items, the pre-defined gesture defined as a user command to deny user access to one of the plurality of items displayed on the display;
determine a location at which the gesture was performed; and
determine an identity code of the stylus performing the gesture; and
a controller configured to:
compare the identity code of the stylus to a pre-stored identity code, wherein the pre-stored identity code is registered as authorized to perform secure operations with the digitizer sensor; and
deny user access to an item that was displayed at the location determined based recognizing the pre-defined gesture and based on the identity code matching the pre-stored identity code.

2. The device of claim 1, wherein the controller is associated with memory configured to store the identity code of the stylus initiating the command to deny user access to the item.

3. The device of claim 1, wherein the pre-stored identity code is stored in memory remote from memory in the device, and wherein the pre-stored identity code is accessible by an application running on the device.

4. The device of claim 3, wherein the controller is configured to verify identity of the user in possession of the stylus and wherein parameters configured to identify the user is stored in the memory remote from the memory in the device.

5. The device of claim 1, wherein the circuit is configured to receive a command initiated by a stylus to open the item and wherein the controller is configured to compare the identity code of the stylus initiating the command with the pre-stored identity code and to restore user access to the item responsive to a match between the identity code of the stylus pre-stored identity code.

6. The device of claim 5, wherein the controller is configured to request verification of identity of the user in possession of the stylus initiating the command and to restore user access to the item based on verifying the identity of the user.

7. The device of claim 6, wherein the information includes at least one of biometric information, a password, a signature and a gesture performed with the stylus.

8. The device of claim 1, wherein the item is selected from a group including: a document, a file, an email, an image, an entry in a table and an application.

9. The device of claim 1, wherein the circuit is configured to determine the location of the stylus based on a first burst signal detected on the digitizer sensor from the stylus and to determine the identity code based on a second subsequent burst signal detected on the digitizer sensor from the stylus.

10. A method comprising:
recognizing a pre-defined gesture performed by a stylus on a touch screen that displays a plurality of items, the pre-defined gesture defined as a user command to deny user access to one of the plurality of items displayed on the touch screen;

determining a location at which the gesture was performed;

determining an identity code of the stylus performing the gesture;

comparing the identity code of the stylus to a pre-stored identity code, wherein the pre-stored identity code is an identity of a stylus that are pre-registered as authorized to perform secure operations with the touch screen; and denying user access to an item that was displayed at the location determined based recognizing the pre-defined gesture and based on the identity code matching the pre-stored identity code.

11. The method of claim 10, wherein the pre-stored identity code is stored in memory remote from memory in a device associated with the touch screen, and wherein the pre-stored identity code is accessible by an application running on the device.

12. The method of claim 10, comprising:

receiving a command initiated by a stylus to open the item;

determining an identity code of the stylus;

comparing identity of the stylus initiating the command to open the item with the pre-stored identity code; and restoring user access to the item responsive to a match between the identity code of the stylus pre-stored identity code.

13. The method of claim 12, comprising:

requesting verification of identity of the user in possession of the stylus initiating the command to open the item; and restoring user access to the item based on verifying the identity of the user.

14. The method of claim 13, wherein the information includes at least one of biometric information, a password, a signature and a gesture performed with the stylus.

15. The method of claim 10, wherein the stylus is operative to transmit the identity code at a pre-defined repetition rate.

16. The method of claim 10, wherein the identity code is transmitted by the stylus in response to a user command.

17. The method of claim 10, wherein the stylus identity code is transmitted in response to the stylus sensing a threshold pressure on a tip of the stylus.

18. The method of claim 10, wherein the identity code is a dynamic identity code.

19. The method of claim 10, wherein the location is determined based on a first burst signal and the identity code is detected based on a second subsequent burst signal, the first and second burst signal transmitted by the stylus at a pre-defined repetition rate.

20. The method of claim 10, wherein the item is selected from a group including:

a document, a file, an email, an image, an entry in a table and an application.

* * * * *